Patented Dec. 5, 1922.

1,437,984

UNITED STATES PATENT OFFICE.

JOHN W. MARDEN, OF SWISSVALE, PENNSYLVANIA, ASSIGNOR TO WESTINGHOUSE LAMP COMPANY, A CORPORATION OF PENNSYLVANIA.

PREPARATION OF RARE METALS.

No Drawing. Application filed December 21, 1920. Serial No. 432,324.

*To all whom it may concern:*

Be it known that I, JOHN W. MARDEN, a citizen of the United States, and a resident of Swissvale, in the county of Allegheny and State of Pennsylvania, have invented a new and useful Improvement in the Preparation of Rare Metals, of which the following is a specification.

This invention relates to the preparation of metals, more especially to the rare metals in powder or coherent form. My invention is more particularly adapted for the production of metals, such as zirconium, titanium, uranium, thorium, vanadium, tungsten, and the like, often known as the refractory metals.

Many attempts have been made to liberate such metals from their compounds in pure elementary form, especially in coherent masses, to allow working of the same for the production of metallic articles, such as filaments, and the like. It has been suggested to reduce a compound, such as a halide of zirconium, by heating the double zirconium potassium halide with metallic sodium, extracting the resulting mass by means of dilute acid, and then washing and drying. It has also been proposed to utilize aluminum in a similar reaction, whereby an alloy of zirconium and aluminum was formed. A method has been suggested in which a volatile halide, as chromium chloride, is heated in the presence of a metal, as iron, to form a volatile halide of the second metal, leaving the first metal as a coating or deposition on the surface of the second metal.

Still another method and one more commonly used for the preparation of tungsten for use in filaments consisted in producing a pure compound of the metal, such as tungsten nitrate, and igniting the same, under carefully controlled conditions, to produce the oxide, which was then placed in a furnace and heated for a long time at a high temperature, in an atmosphere of hydrogen, to reduce the oxide to the metal.

The oxides of zirconium, titanium, thorium, uranium and some other refractory metals cannot be reduced by hydrogen, as in the method used for tungsten powder. The volatile-halide method is primarily suitable for producing metal coatings, such as a coating of chromium on iron. This method, furthermore, requires that both the halide used and the halide formed be volatile at the temperature of the reaction. Furthermore, in all previous methods either an impure metal, such as an alloy, is formed or, except in the case of the volatile-halide method, a metal powder is obtained. In all of the known methods for the production of zirconium, for example, the products of the reaction, such as aluminum chloride or sodium chloride, must be washed out with water and dilute acid, thereby introducing impurities.

The method described below differs from the above in that I use a non-volatile salt of the metal to be reduced, which does not melt or volatilize appreciably in any way at the temperature of reaction, together with a volatile metal, obtaining a product which is non-volatile or sublimable at the temperature of the reaction. In the case of potassium fluozirconate and sodium, the temperature of the reaction is about 600° to 700° C. The salts which are formed during the reaction, together with any of the original salts remaining after the reaction, may be removed by raising the temperature sufficiently to effect their volatilization, the temperature at no time exceeding the melting point of the liberated metal. By continuing the heat treatment, the liberated metal may be sintered and thus obtained in a coherent state.

My invention obviates the disadvantages of the prior methods, it being among the objects thereof to prepare metals of the rare or refractory elements of great purity, in the powdered or coherent state, in a comparatively simple manner.

In practicing my invention, I prepare a mixture of a halide of a metal to be formed and a metal, such as aluminum, and heat the mixture to cause a reaction, thus liberating the rare metal and forming an aluminum or other halide after the reaction is complete. The heat in the receptacle is then made sufficient to volatilize all the salts, leaving the pure rare metal only. I generally utilize less than the theoretical amount of metal necessary to reduce the rare-metal compound and thereby avoid the possibility of forming an alloy with such metal, since it is all converted into the halide and subsequently volatilized.

A specific example of the operation of my invention for the production of rare metals is as follows: I prepare a double salt of zirconium and potassium fluoride which melts at about 1000° C. and is not volatile at the reaction temperature and mix the same, in dry, finely-divided form, with the theoretical quantity or somewhat less than the theoretical quantity of aluminum, iron, or other metal which will displace the zirconium from the compound and capable of forming salts with the acidic component of the zirconium salt, the said salts having lower volatilization temperatures than zirconium. In the case of zirconium, nearly any metal above hydrogen in the electrochemical series of the metals is suitable. The mixture is then placed in a molybdenum or other metal crucible in a suitable furnace, and heat treated in an inert environment. Such a furnace is disclosed in a copending application of H. C. Rentschler, Serial No. 430,118, filed Dec. 13, 1920, on Furnaces, and assigned to the Westinghouse Lamp Company. Details concerning a satisfactory heat treatment is described in a copending application of J. W. Marden and H. C. Rentschler, Serial No. 432,325, filed Dec. 21, 1920, on the fusing and sintering of metal powders into coherent metals and assigned to the Westinghouse Lamp Company.

Briefly, this furnace may comprise a chamber, usually of glass, containing a spirally wound coil connected to a source of high-frequency current. The crucible is placed within the coil and the chamber is evacuated. High-frequency current is passed through the primary coil, inducing secondary currents in the crucible and contents, causing heating to take place and causing a reaction between the salt and metal, forming zirconium and aluminum fluoride which does not volatilize appreciably at the temperature of reaction. After the reaction is completed, heating to a much higher temperature causes volatilization of the aluminum fluoride, potassium fluoride, and any undecomposed double potassium zirconium fluoride remaining. The zirconium is then in a black or grayish spongy mass and may be removed from the furnace for further treatment. If desired, the heating may be continued, causing the mass to shrink and sinter forming white, coherent metal.

This reaction does not depend upon the relative volatilities of the compounds of the reaction. It is not necessary that the aluminum fluoride or potassium fluoride ordinarily obtained in this reaction be more volatile than the halide reduced, as is necessary in the volatile halide method.

The equation representing this reaction is as follows:

$$3K_2ZnF_6 + 4Al = 6KF + 4AlF_3 + 3Zn$$

Since practically all salts likely to be used in this reaction may easily be volatilized at the high temperature in the vacuum utilized, it is not necessary to have a very volatile fluoride or other halide formed by the metal used as the reducing agent, as has generally been the case in methods practiced heretofore.

Similar reactions may be utilized for the production of other rare metals in either the powdered or the coherent state. I have found that, in the case of titanium, the double potassium titanium fluoride is suitable, since it may easily be purified by recrystallization. In the case of uranium, the simple fluoride appears to be the best salt for my purpose. Thorium, in the form of tetra-chloride prepared by the ignition of the double ammonium thorium chloride, may be used in my process.

It will be seen that my method comprises a few simple steps, not requiring any special skill, and the metals produced thereby are in a high state of purity. I merely prepare a stable salt of the metal to be reduced in anhydrous form, and intimately mix the same with a powdered metal, place the material in a suitable furnace, and heat to produce the pure metal in either the powdered or the coherent state.

Although I have specifically described the production of zirconium from its double fluoride and have also named various compounds of other rare metals which may be reduced in a similar manner, it is obvious that my invention is not limited to the salts named or to the metals, such as aluminum and iron for reducing the compounds. I am not restricted to the use of a high-frequency induction furnace for the heating but I have found that such heating is more effective, especially in connection with a high vacuum. The vacuum, aids in the volatilization of the salts and further prevents oxidation of the metal formed or the combining with other gases or vapors. Such oxidation occurs very readily with some of the rare metals, especially uranium.

I have described my new method stating that the mixture of salt and metal is placed in a molybdenum crucible and placed in the furnace. It is obvious that I may use a crucible of any suitable form or I may dispense with the crucible altogether and form the mixture in a mold into a coherent pellet or disk or other suitable shape and place the same in the furnace and proceed, as indicated, to form a coherent metallic mass having the shape of the molded powdered mixture.

I claim as my invention:

1. A method of preparing refractory metals which comprises mixing a comparatively non-volatile anhydrous halide of a refractory metal with less than the theoretical amount of a metal necessary to completely reduce said halide and capable of forming salts with the acidic component of the refractory metal salt having lower volatilization temperatures than said metal, heating the mixture to reaction temperature, and then further heating to volatilize the salts in the mixture after the reaction.

2. A method of preparing rare metals which comprises mixing a comparatively non-volatile anhydrous halide of a rare metal with a metal capable of displacing the same and capable of forming salts with the acidic component of the rare metal salt having lower volatilization temperatures than the said metal, heating the mixture in an inert environment to reaction temperature and then further heating to volatilize all the salts remaining in the mixture after the reaction.

3. A method of preparing refractory metals which comprises mixing a comparatively non-volatile anhydrous halide of a refractory metal with less than the theoretical amount of a metal necessary to completely reduce said halide and capable of forming salts with the acidic component of the refractory metal salt having lower volatilization temperatures than said metal, heating the mixture to a sufficiently high temperature to effect a reaction, and continuing the heat treatment until all the salts, remaining in the mixture after the reaction, are volatilized.

4. A method of preparing rare metals which comprises mixing a comparatively non-volatile anhydrous halide of a rare metal with a metal capable of displacing the same, and capable of forming salts with the acidic component of the rare metal salt having lower volatilization temperatures than the said metal, heating the mixture in an inert environment to reaction temperature, and subsequently removing the salts formed during the reaction and all the original salts remaining.

5. A method of preparing refractory metals which comprises mixing a comparatively non-volatile anhydrous halide of a refractory metal with less than the theoretical amount of a metal necessary to completely reduce said halide and capable of forming salts with the acidic component of the refractory metal salt having lower volatilization temperatures than said metal, heating the mixure to a sufficiently high temperature to volatilize all the salts and to sinter the refractory metal.

6. A method of preparing refractory metals which comprises mixing a comparatively non-volatile anhydrous halide of refractory metal with less than the theoretical amount of a metal necessary to completely reduce said halide and capable of forming salts with the acidic component of the refractory metal salt having lower volatilization temperatures than said metal, and heating the mixture in a vacuum to reaction temperature and below the melting point of the refractory metal.

7. A method of preparing refractory metals which comprises mixing a comparatively non-volatile anhydrous halide of a refractory metal with less than the theoretical amount of a metal necessary to completely reduce such salt and capable of forming salts with the acidic component of the refractory metal salt having lower volatilization temperatures than said metal, heating the mixture in a vacuum to a sufficiently high temperature to volatilize all salts and to sinter the refractory metal.

8. A method of preparing rare metals which comprises a comparatively non-volatile anhydrous halide of a rare metal with less than the theoretical amount of a metal necessary to completely reduce said halide and capable of forming salts with the acidic component of the rare metal salt having volatilization temperatures lower than said metal, and heating the mixture in a vacuum to reaction temperature and below the melting point of the rare metal.

9. A method of preparing rare metals which comprises mixing a comparatively non-volatile anhydrous halide of a rare metal with less than the theoretical amount of a metal necessary to completely reduce such salt and capable of forming salts with the acidic component of the rare metal salt having volatilization temperatures lower than said metal, heating the mixture in a vacuum to a sufficiently high temperature to volatilize all salts and to sinter the rare metal.

10. A method of preparing rare metals which comprises mixing a comparatively non-volatile anhydrous fluoride of a rare metal with a metal necessary to completely reduce such salt and heating the mixture in an inert environment to a temperature below that of the melting point of the rare metal.

11. A method of preparing zirconium which comprises mixing a fluoride of zirconium with aluminum, and heating the mixture in a vacuum.

12. A method of preparing zirconium which comprises mixing a double zirconium potassium fluoride with aluminum, and heating the mixture in a vacuum.

13. A method of preparing titanium which comprises mixing a fluoride of titanium with aluminum, and heating the mixture in a vacuum.

14. A method of preparing titanium which comprises mixing a double titanium potassium fluoride with aluminum, and heating the mixture in a vacuum.

15. A method of preparing uranium which comprises mixing a fluoride of uranium with aluminum, and heating the mixture in a vacuum.

16. A method of preparing thorium which comprises mixing a chloride of thorium with aluminum, and heating the mixture in a vacuum.

17. A method of preparing vanadium which comprises mixing a fluoride of vanadium with aluminum, and heating the mixture in a vacuum.

18. A method of preparing tungsten which comprises mixing a fluoride of tungsten with aluminum, and heating the mixture in a vacuum.

19. A method of preparing metals which comprises mixing a halide of any one of the following rare metals, zirconium, titanium, uranium, thorium, vanadium, tungsten, with one of the following metals, aluminum, iron, and heating the mixture in a vacuum.

20. A method of preparing rare metals which comprises mixing a comparatively non-volatile anhydrous halide of a rare metal with aluminum and heating the mixture in an inert environment to a temperature below the melting point of the rare metal.

21. A method of preparing zirconium which comprises mixing a comparatively non-volatile anhydrous halide of zirconium with aluminum and heating the mixture in an inert environment to reaction temperature but below that of the melting point of zirconium.

22. A method of preparing titanium which comprises mixing a comparatively non-volatile anhydrous halide of titanium with aluminum and heating the mixture in an inert environment to reaction temperature and below the temperature of the melting point of titanium.

23. A method of preparing uranium which comprises mixing a comparatively non-volatile anhydrous halide of uranium with less than the theoretical amount of a metal necessary to completely reduce said halide and capable of forming salts with the acidic component of the uranium salt having volatilization temperatures lower than that of uranium and heating the mixture in an inert environment to a temperature below that of the melting point of uranium.

24. A method of preparing thorium which comprises mixing a comparatively non-volatile anhydrous halide of thorium with a metal necessary to completely reduce said halide and capable of forming salts with the acidic component of the thorium salt having volatilization temperatures lower than that of thorium, and heating the mixture in an inert environment to a temperature below that of the melting point of thorium.

25. A method of preparing vanadium which comprises mixing a comparatively non-volatile anhydrous halide of vanadium with a metal necessary to completely reduce said halide and capable of forming salts with the acidic component of the vanadium salt having volatilization temperatures lower than that of vanadium and heating the mixture in an inert environment to a temperature below that of the melting point of vanadium.

26. A method of preparing tungsten which comprises mixing a comparatively non-volatile anhydrous halide of tungsten with a metal necessary to completely reduce said halide and capable of forming salts with the acidic component of the tungsten salt having volatilization temperatures lower than that of tungsten, and heating the mixture in an inert environment to a temperature below that of the melting point of tungsten.

In testimony whereof, I have hereunto subscribed my name this 15th day of December 1920.

JOHN W. MARDEN.

Certificate of Correction.

It is hereby certified that in Letters Patent No. 1,437,984, granted December 5, 1922, upon the application of John W. Marden, of Swissvale, Pennsylvania, for an improvement in "Preparation of Rare Metals," errors appear in the printed specification requiring correction as follows: Page 2, line 72, strike out the equation and insert instead $3K_2ZrF_6+4Al=6KF+4AlF_3+3Zr.;$ same page, lines 80 and 81, for the word "heretobefore" read *heretofore;* page 3, line 91, claim 8, after the word "comprises" insert the word *mixing;* and that the said Letters Patent should be read with these corrections therein that the same may conform to the record of the case in the Patent Office.

Signed and sealed this 20th day of March, A. D., 1923.

[SEAL.]
              KARL FENNING,
             *Acting Commissioner of Patents.*